(12) United States Patent
Inoue et al.

(10) Patent No.: US 6,853,403 B1
(45) Date of Patent: Feb. 8, 2005

(54) DIGITAL CAMERA HAVING A SELF-TIMER SHOOTING FUNCTION

(75) Inventors: Yoshiyuki Inoue, Izumi (JP); Daigo Yoshioka, Toyonaka (JP); Shoichi Minato, Sakai (JP)

(73) Assignee: Minolta Co., Ltd., Osaka (JP)

( * ) Notice: Subject to any disclaimer, the term of this patent is extended or adjusted under 35 U.S.C. 154(b) by 758 days.

(21) Appl. No.: 09/660,901

(22) Filed: Sep. 13, 2000

(30) Foreign Application Priority Data

Sep. 16, 1999 (JP) .......................................... 11-261888

(51) Int. Cl.[7] ............................................. H04N 5/222
(52) U.S. Cl. ............................. 348/333.11; 348/333.01; 348/207.99; 396/264
(58) Field of Search ............................ 348/221.1, 295, 348/363, 211.99, 333.01–333.13, 211.1–211.9, 211–212; 396/373, 374, 264, 286

(56) References Cited

U.S. PATENT DOCUMENTS

| | | | | |
|---|---|---|---|---|
| 5,561,462 A | * | 10/1996 | Nagano | 348/372 |
| 5,721,981 A | * | 2/1998 | Kosaka et al. | 396/130 |
| 6,411,780 B1 | * | 6/2002 | Maruyama | 396/59 |
| 6,441,854 B2 | * | 8/2002 | Fellegara et al. | 348/333.13 |

FOREIGN PATENT DOCUMENTS

JP            11-191875           7/1999

* cited by examiner

Primary Examiner—Ngoc-Yen Vu
Assistant Examiner—Kelly L. Jerabek
(74) Attorney, Agent, or Firm—Sidley Austin Brown & Wood LLP

(57) ABSTRACT

In a digital camera having a self-timer function, the time for which the shot image is displayed in a self-timer shooting mode is longer than the time for which the shot image is displayed in a normal shooting mode.

9 Claims, 6 Drawing Sheets

DIGITAL CAMERA HAVING A SELF-TIMER SHOOTING FUNCTION

This application is based on the application No. 11-261888 filed in Japan, the content of which is hereby incorporated by reference.

BACKGROUND OF THE INVENTION

1. Field of the Invention

The present invention relates to a digital camera having a self-timer shooting function and an image display function.

2. Description of the Related Art

In resent years, digital cameras have rapidly been becoming widespread, and various types of digital cameras are supplied to the market. Generally, a digital camera frequently has an image display device comprising a liquid crystal display (hereinafter, referred to as an LCD) or the like on its back. Because of the LCD, the photographer can confirm the image to be shot without viewing through the finder. Therefore, it is possible to shoot the subject at an extremely free angle. Moreover, a conventional digital camera is provided with a function to continue displaying the shot image on the image display device for a predetermined time every time one frame is shot, that is, a function to hold the shot image for a predetermined time. Because of this function, the photographer can check whether the shot image is desired or not without performing any complicated operations.

Whether silver halide film cameras or digital cameras, cameras are frequently provided with a function to perform shooting by use of a self-timer (hereinafter, referred to as a self-timer function). According to the self-timer function which is used, for example, when the photographer himself or herself is the subject to be shot, shooting is on standby for a predetermined time after the depression of the release button, and shooting is performed after the predetermined time has elapsed. Because of this function, the photographer can shoot himself or herself by moving to the position of shooting within the predetermined time after depressing the release button.

However, since the photographer is the subject when self-timer shooting is performed as mentioned above, it takes time for the photographer to return to the camera after shooting is performed. Therefore, even though the digital camera has the image display device and the function to display the shot image for a predetermined time, it frequently occurs that the display of the shot image ends before the photographer returns to the camera to check the display device on the back of the camera. That is, the photographer cannot check the shot image. Since recorded images can be read out from a recording medium and played back, the shot image can be checked by playing it back. However, complicated operations-such as switching to a reproduction mode and specification of the frame to be played back are necessarily performed every time, which is inconvenient.

In view of the above-mentioned problem, an object of the present invention is to provide a digital camera in which the photographer can easily check whether the shot image is desired or not without performing any complicated operations even when self-timer shooting is performed.

SUMMARY OF THE INVENTION

To achieve the above-mentioned object, a digital camera according to the present invention is provided with: an image sensor for shooting a subject; a selector for selecting a predetermined shooting mode, wherein the shooting mode is a mode in which shooting is performed after a first predetermined time has elapsed from an instruction to start shooting; a first display controller for displaying a shot image on a display for a second predetermined time when the shooting mode is not selected; and a second display controller for displaying a shot image on the display for a third predetermined time being longer than the first predetermined time when the shooting mode is selected.

BRIEF DESCRIPTION OF THE DRAWINGS

In the following description, like parts are designated by like reference numbers throughout the several drawings.

DETAILED DESCRIPTION OF THE PREFERRED EMBODIMENT

Figure 1A:
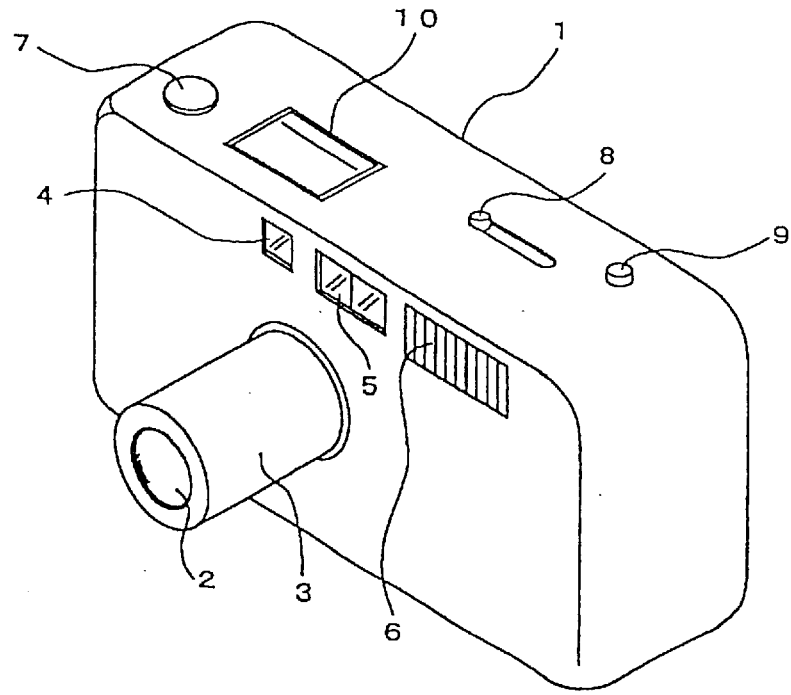
FIGS. 1(a) and 1(b) are schematic perspective views of a digital camera according to the present invention obliquely looked down on from the front.
Figure 1B:
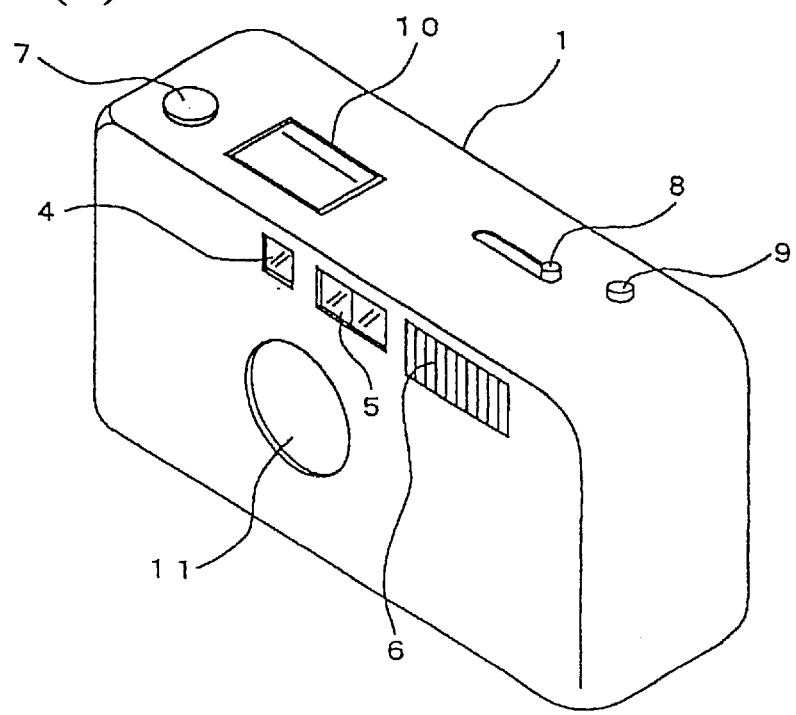

A digital camera according to the present invention will be described with reference to FIGS. 1 to 6. FIGS. 1(a) and 1(b) are schematic perspective views of the digital camera according to the present invention obliquely looked down on from the front. FIG. 1(a) shows the camera in an activated state. FIG. 1(b) shows the camera in a deactivated state. As shown in FIGS. 1(a) and 1(b), the digital camera according to the present invention has a lens barrel 3 for holding a taking lens 2 on the front surface of a camera body 1. The lens barrel 3 protrudes from the camera body 1 when the camera is activated, and collapses into the camera body 1 when the camera is deactivated. Because of this structure, the camera is very compact when deactivated, which provides excellent carryability. Moreover, when the camera is deactivated, a lens barrier 11 is closed so that the taking lens 2 is covered. Because of this structure, the taking lens 2 can be prevented from being inadvertently made dirty or broken when the camera is carried. In addition to the above-described members, a finder window 4, an AF unit 5 for automatic focus detection and a flash 6 are provided on the front surface of the camera body 1.

On the top surface of the camera body 1, operation members 7 to 9 and a display 10 are provided. A release button 7 is an operation member having first- and second-stroke depression conditions. With the first-stroke depression (half depression) of the release button 7, shooting preparations such as distance measurement are performed, and with the second-stroke depression (full depression), recording (shooting) is performed. A mode switch 8 is a slide operation member used for switching the operation mode among an "OFF mode", a "recording (shooting) mode" and a "reproduction mode". A self-timer shooting setting switch 9 for setting the shooting mode of the camera is used for switching between a "normal shooting mode" and a "self-timer shooting mode". In the present invention, the normal shooting mode is a mode in which shooting is performed immediately after an instruction to start shooting is provided and processing necessary for shooting is performed. The self-timer shooting mode is a mode in which shooting is performed after a time which is the sum of a predetermined time and the time from the instruction of shooting to shooting in the normal shooting mode has elapsed. Detailed operations of the operation members 7 to 9 will be described later. The display 10 comprising an LCD or the like is for displaying shooting data, setting of self-timer shooting, the frame number in shooting and other contents of the set mode.

Figure 2:
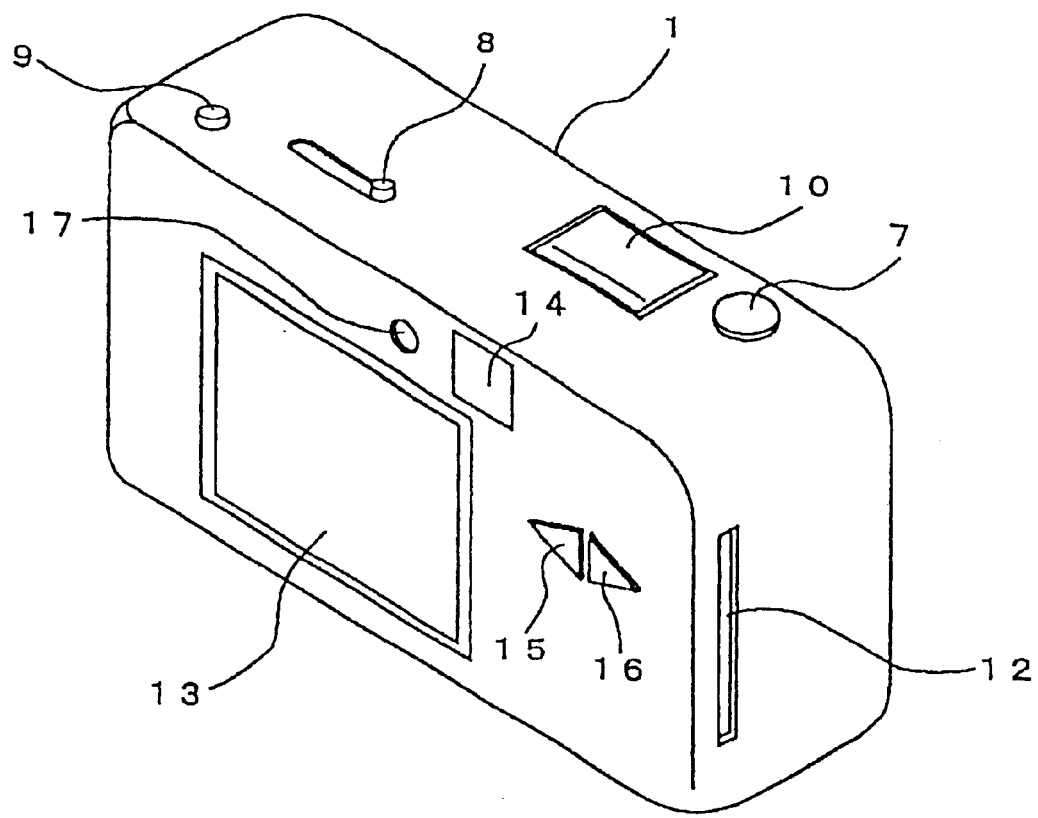
FIG. 2 is a schematic perspective view of the digital camera according to the present invention obliquely looked down on from the rear.

FIG. 2 is a schematic perspective view of the digital camera according to the present invention obliquely looked down on from the rear. As shown in FIG. 2, a memory card slot 12 is provided on a side surface of the camera body 1. The memory card slot 12 has a slit form and is provided for inserting a memory card serving as an external recording medium into the camera body 1. On the back surface of the camera body 1, an image display LCD 13 is provided. Since the image display LCD 13 is thin and lightweight, the carryability of the camera is not impaired. Because of the image display LCD 13, in the recording (shooting) mode, the photographer can confirm the image to be shot without viewing through the finder window. Therefore, the subject can be shot at an extremely free angle. Moreover, since the shot image is displayed on the image display LCD 13 after shooting until a predetermined time has elapsed, the photographer can check whether the shot image is desired or not without performing any complicated operations. In the reproduction mode, the recorded images can be selectively displayed on the image display LCD 13. Since an optical finder and a finder window 14 for viewing are provided besides the image display LCD 13, when the image display LCD 13 is in a non-displaying state (off), the photographer can perform shooting while viewing through the finder window 14. Because of this structure, battery drain can be restrained by cutting off the power consumed by the image display LCD 13, so that the camera can be driven for a longer time.

On the back surface of the camera body 1, operation buttons 15 and 16 are provided. The operation buttons 15 and 16 have different functions according to the operation mode of the camera. That is, in the recording (shooting) mode, the operation buttons 15 and 16 function as zoom buttons for adjusting the shooting field. The taking lens 2 is zoom-driven toward the wide-angle side when the operation button 15 is depressed, and is zoom-driven toward the telephoto side when the operation button 16 is depressed. In the reproduction mode, the operation buttons 15 and 16 function as access buttons for calling up recorded images. When the operation button 15 is depressed, recorded images to be displayed on the image display LCD 13 are called up in forward order, and when the operation button 16 is depressed, recorded images are called up in inverse order.

In addition to the above-described members, an in-focus display lamp 17 is provided on the back surface of the camera body 1. When the release button 7 is first-stroke-depressed (half depressed), the in-focus display lamp 17 is turned on in a case where the shooting preparations are normally finished, and blinks in a case where the shooting preparations are not normally finished. Because of this structure, when the in-focus display lamp 17 is blinking, the photographer can be informed that shooting is impossible, for example, because the distance to the subject is too short or the flash is being charged.

Figure 3:
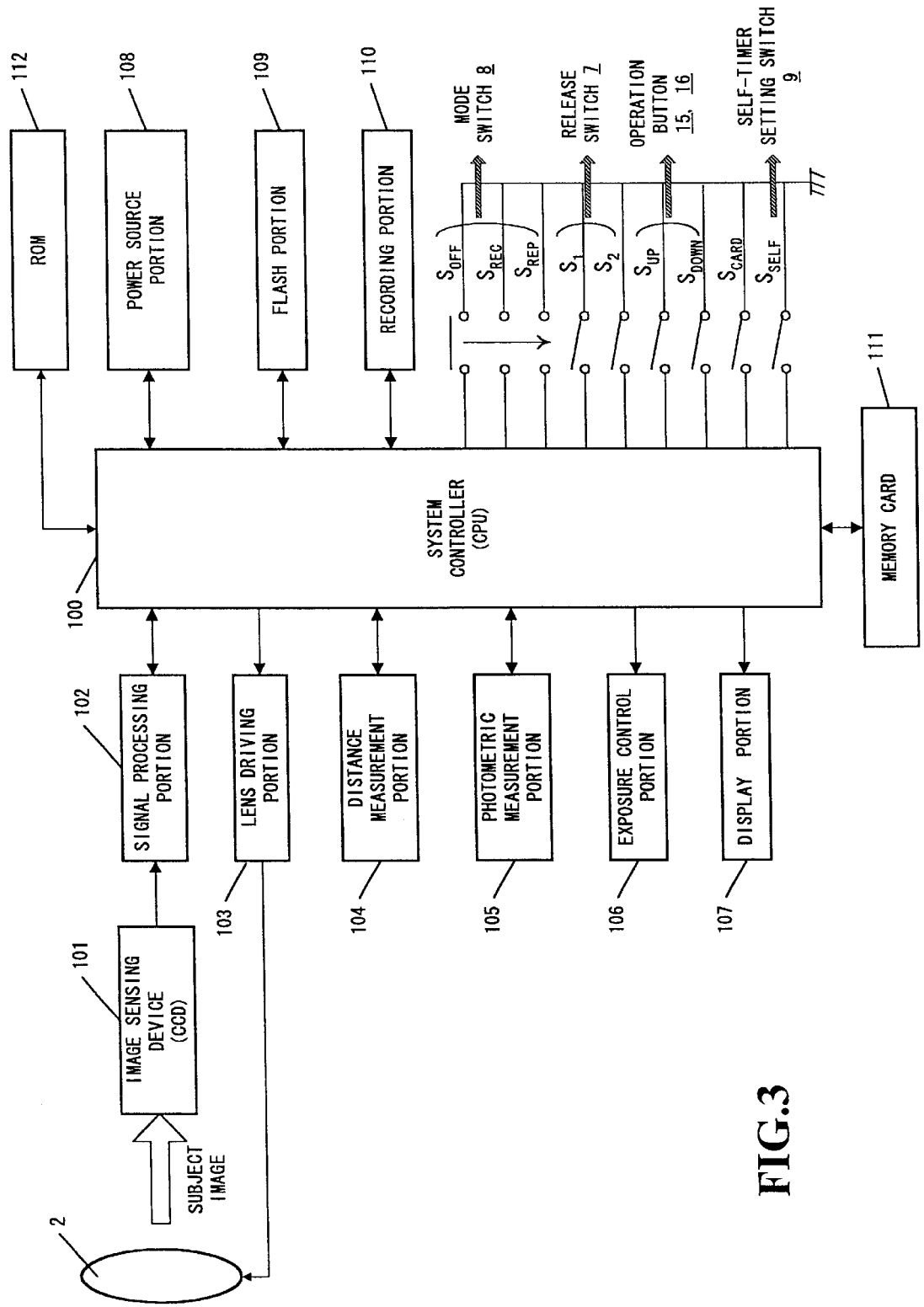
FIG. 3 is a block diagram showing the general structure of the digital camera according to the present invention.

Next, the internal structure and operation of the digital camera according to the present invention will be described with reference to FIG. 3. FIG. 3 is a block diagram showing the general structure of the digital camera according to the present invention. The operation of the digital camera according to the present invention is controlled by a system controller 100 having a central processing unit (CPU) (hereinafter, referred to as CPU 100) and a program in a read only memory (ROM) 112 connected to the CPU 100. To perform image capture, a subject image formed through the taking lens 2 is captured by a solid-state image sensing device 101 (hereinafter, referred to as CCD 101) and image processing is performed on the output signal from the CCD 101 at a signal processing portion 102. In image capture, a lens driving portion 103 drives the taking lens 2 so as to be in an in-focus state. The drive amount of the taking lens 2 is a value calculated by the CPU 100 based on distance measurement data obtained by a distance measurement portion 104. The distance measurement portion 104 finds the focus condition, for example, by the phase difference detection method. A photometric measurement portion 105 supplies the CPU 100 with photometric data obtained by measuring the subject brightness.

The CPU 100 calculates the shutter speed Tv and the aperture value Av based on the data input from the distance measurement portion 104 and the photometric measurement portion 105, and outputs the calculated values to an exposure control portion 106. The exposure control portion 106 controls exposure based on the data Tv and Av. A display portion 107 comprises the display 10, the image display LCD 13 and portions for driving them. The image and various pieces of information obtained through the above-described operations are output by the display portion 107.

A power source portion 108 supplies a predetermined high voltage to the CCD 101, and a voltage of a predetermined level to other circuit portions. A flash portion 109 causes the flash 6 to emit light based on a voltage increase control signal for charging and a light emission control signal output from the CPU 100. A recording portion 110 is a data recording portion permanently provided in the camera body 1. In the recording portion 110, shooting data having undergone predetermined image processing at the signal processing portion 102 in shooting is recorded. The recording portion 110 may be used as a buffer memory for a memory card 111 attachable to the camera body 1, or may be used as a main memory for image recording because the recording portion 110 has a certain amount of storage capacity. The memory card 111 is a recording medium comprising a static random access memory (SRAM) or the like on which a plurality of images can be recorded. To move shooting data to a personal computer or the like, first, the shooting data is transferred to the memory card 111, and then, the shooting data recorded on the memory card 111 is read out on the side of the personal computer.

Next, switches $S_{OFF}$ to $S_{self}$ will be described. Of switches $S_{OFF}$, $S_{REC}$ and $S_{REP}$, only the one selected by the mode switch 8 is on and the other switches are off. The switch $S_{OFF}$ is on when the mode switch 8 is in the "OFF" position, so that the camera is deactivated. At this time, the lens driving portion 103 causes the lens barrel 3 to collapse and closes the lens barrier 11. The switch $S_{REC}$ is on when the mode switch 8 is in the "recording (shooting)" position, so that the camera is in a shooting possible state. At this time, the lens driving portion 103 opens the lens barrier 11 and causes the lens barrel 3 to protrude. The switch $S_{REP}$ is on when the mode switch 8 is in the "reproduction" position. At this time, the access to the recording portion 110 and the memory card 111 is permitted, so that the camera is in a state in which data transfer to a personal computer or the like is possible.

Switches $S_1$ and $S_2$ are activated by operating the release switch 7. With the first-stroke depression (half depression) of the release switch 7, the switch $S_1$ is turned on, so that the CPU 100 instructs the circuit portions to perform shooting preparations such as distance measurement. With the second-stroke depression (full depression) of the release switch 7, the switch S2 is turned on, so that the CPU 100 instructs the circuit portions to shooting operations such as exposure. Details of the release sequence will be described later. Switches $S_{up}$ and $S_{down}$ are switches for accessing recorded images, and are activated by depressing the operation buttons 15 and 16 in the reproduction mode. Every time the operation button 15 is depressed, the switch $S_{up}$ is turned on, so that recorded images are displayed on the image display LCD 13 one by one in forward order. On the other hand, every time the operation button 16 is depressed, the switch $S_{down}$ is turned on, so that recorded images are displayed on the image display LCD 13 one by one in inverse order.

A switch $S_{CARD}$ is a memory card recognition switch which is on when the memory card 111 is inserted in the camera body 1. A switch $S_{self}$ is alternately turned on and off every time the self-timer shooting setting switch 9 is depressed. When the switch $S_{self}$ is on, the camera is in the "self-timer shooting mode", and when the switch $S_{self}$ is off, the camera is in the "normal shooting mode". The "self-timer shooting mode" is a shooting mode in which shooting is on standby for a first predetermined time t1 (hereinafter, sometimes referred to as self time) after the release button 7 is second-stroke-depressed (fully depressed) and shooting is performed after the first predetermined time t1 has elapsed. Because of this function, the photographer himself or herself can be the subject. In the "normal shooting mode", shooting is performed immediately after the release button 7 is second-stroke-depressed (fully depressed).

Figure 4:
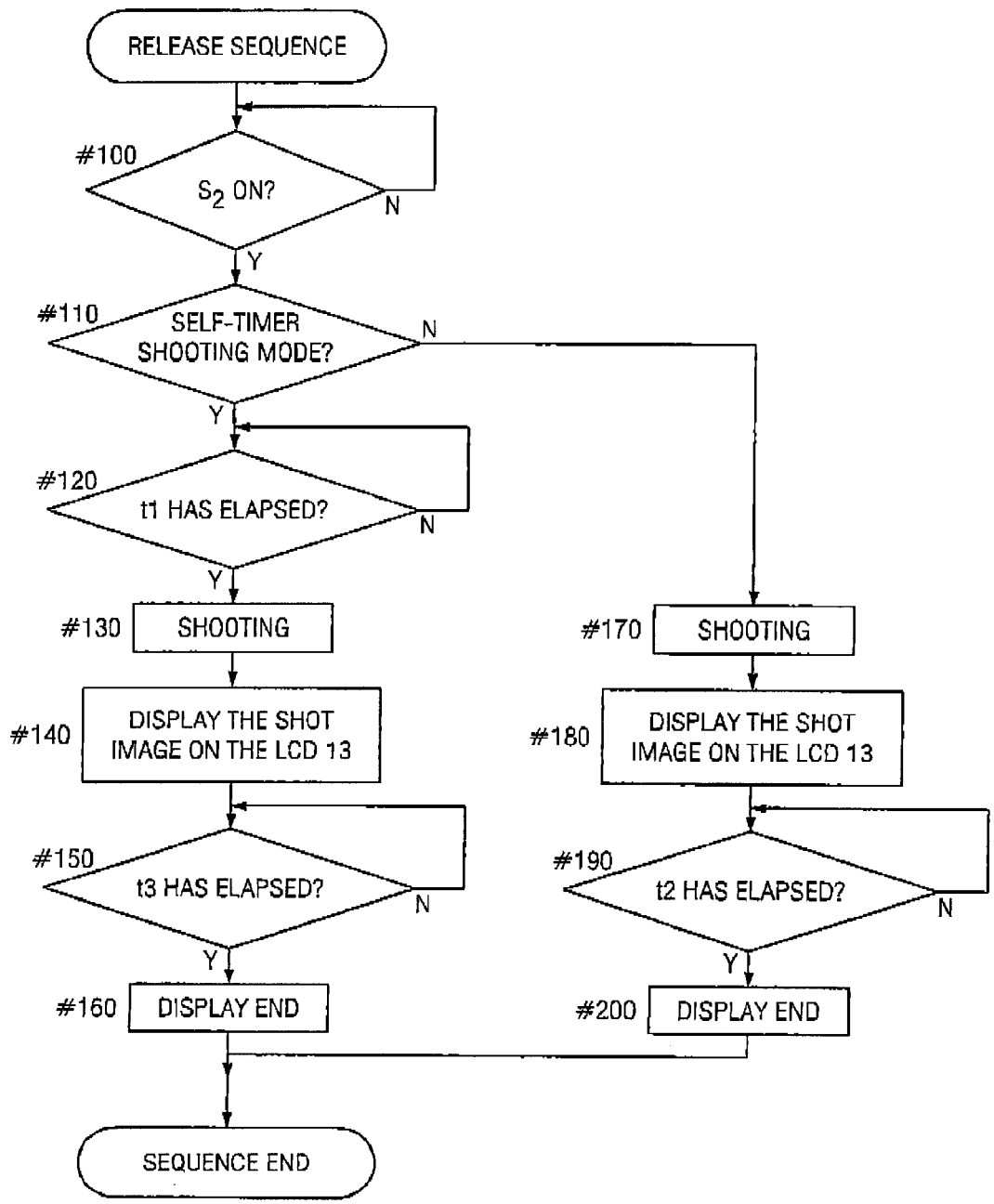
FIG. 4 is a flowchart showing the release sequence in a first embodiment.

Next, the release sequence in a first embodiment of the digital camera according to the present invention will be described with reference to FIG. 4. FIG. 4 is a flowchart showing the release sequence in the first embodiment. In this embodiment, the time for which the shot image is displayed after shooting in the "self-timer shooting mode" is longer than that in the "normal shooting mode". This image display control is performed by the CPU 100 as mentioned above.

First, at step #100, whether an instruction to start shooting is provided or not (whether the switch S2 is on or off) is determined. When an instruction to start shooting is provided, whether the camera is in the self-timer shooting mode or not (whether the switch $S_{self}$ is on or off) is determined at step #110. When the camera is not in the self-timer shooting mode, that is, when the switch $S_{self}$ is off, it is determined that the camera is in the "normal shooting mode", and the process moves to step #170 to perform shooting immediately after an instruction to start shooting is provided. In shooting, the lens driving portion 103 drives the lens based on the data obtained by the distance measurement portion 104, and the exposure control portion 106 controls exposure based on the data obtained by the photometric measurement portion 105. When necessary, the flash portion 109 causes the flash 6 to emit light. After shooting is finished, at step #180, the shot image is displayed on the image display LCD 13. At step #190, the display of the shot image on the image display LCD 13 is continued until a shot image display time (second predetermined time t2) has elapsed. Because of this, the photographer can check the image having just been shot. After the second predetermined time t2 has elapsed, the process moves to step #200 to end the display of the shot image. With this, shooting of one frame in the "normal shooting mode" is finished, and the sequence ends.

When it is determined at step #110 that the camera is in the "self-timer shooting mode", that is, when the switch $S_{self}$ is on, the process moves to step #120 so that shooting is on standby for the first predetermined time t1 (for example, 10 seconds). After the first predetermined time t1 has elapsed, the process moves to step #130 to perform shooting like at step #170. After shooting is finished, at step #140, the shot image is displayed on the image display LCD 13. At step #150, the display of the shot image on the image display LCD 13 is continued until a shot image display time (third predetermined time t3) has elapsed. Here, the third predetermined time t3 is longer than the shot image display time (second predetermined time t2) in the "normal shooting mode". For example, when the second predetermined time t2 is two seconds, the third predetermined time t3 is, for example, 15 seconds. Because of this, it does not occur that the display of the shot image ends before the photographer who is the subject returns to the camera. Therefore, the photographer can check the image having just been shot, without performing any complicated operations.

By setting the shot image display time (third predetermined time t3) so as to be also longer (15 seconds) than the self time (first predetermined time t1, 10 seconds) like in this embodiment, it is unnecessary for the photographer to flurry when returning to the camera after shooting. The third predetermined time t3 may be set by the photographer. In this case, after shooting, the photographer returns to the camera within the time set by the photographer. Since the photographer knows the time for which the display of the shot image is continued, the photographer can return to the camera without flurrying. After the third predetermined time t3 has elapsed, the process moves to step #160 to end the display of the shot image. With this, shooting of one frame in the "self-timer shooting mode" is finished, and the sequence ends.

Figure 5:
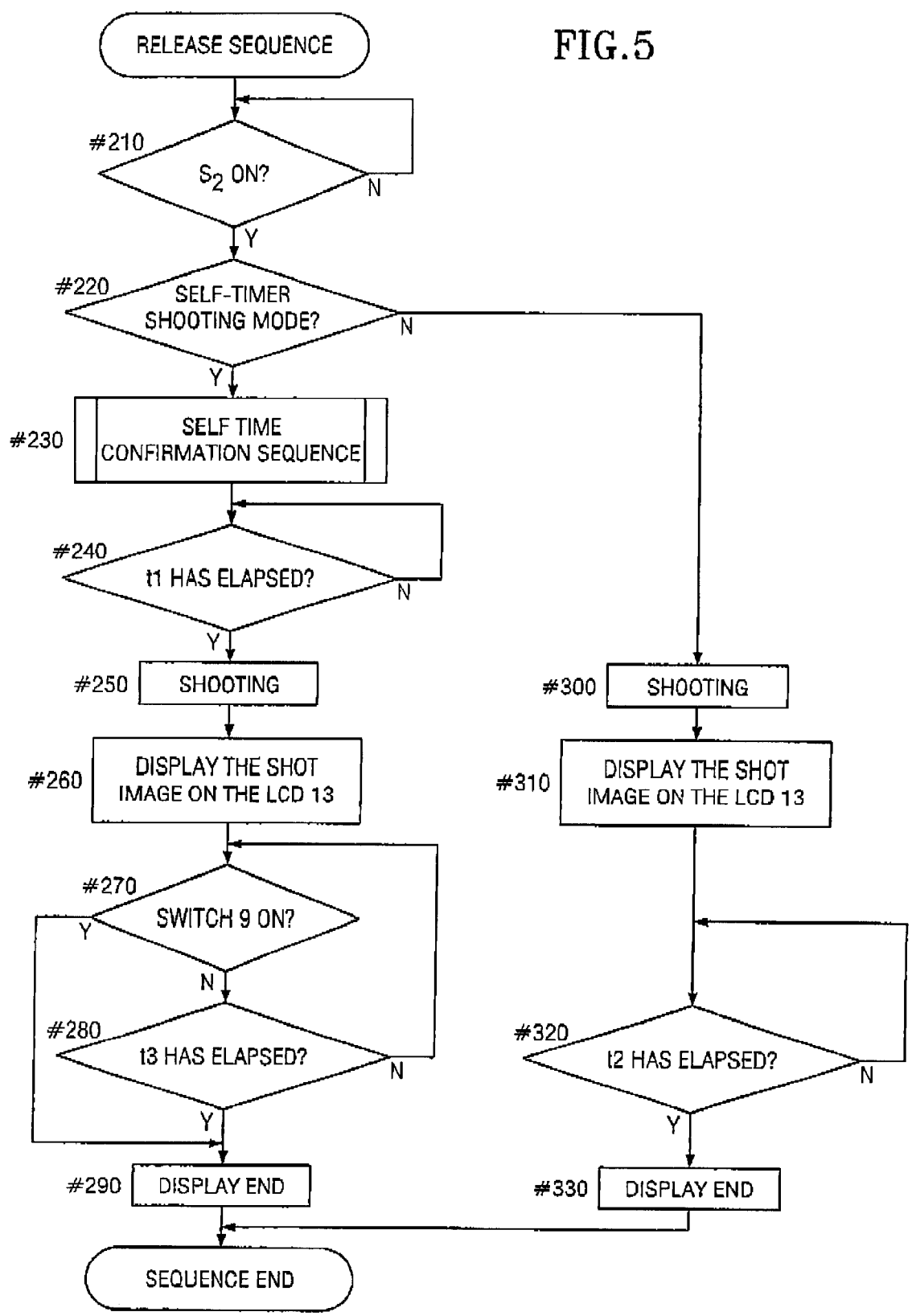
FIG. 5 is a flowchart showing the release sequence in a second embodiment.
Figure 6:
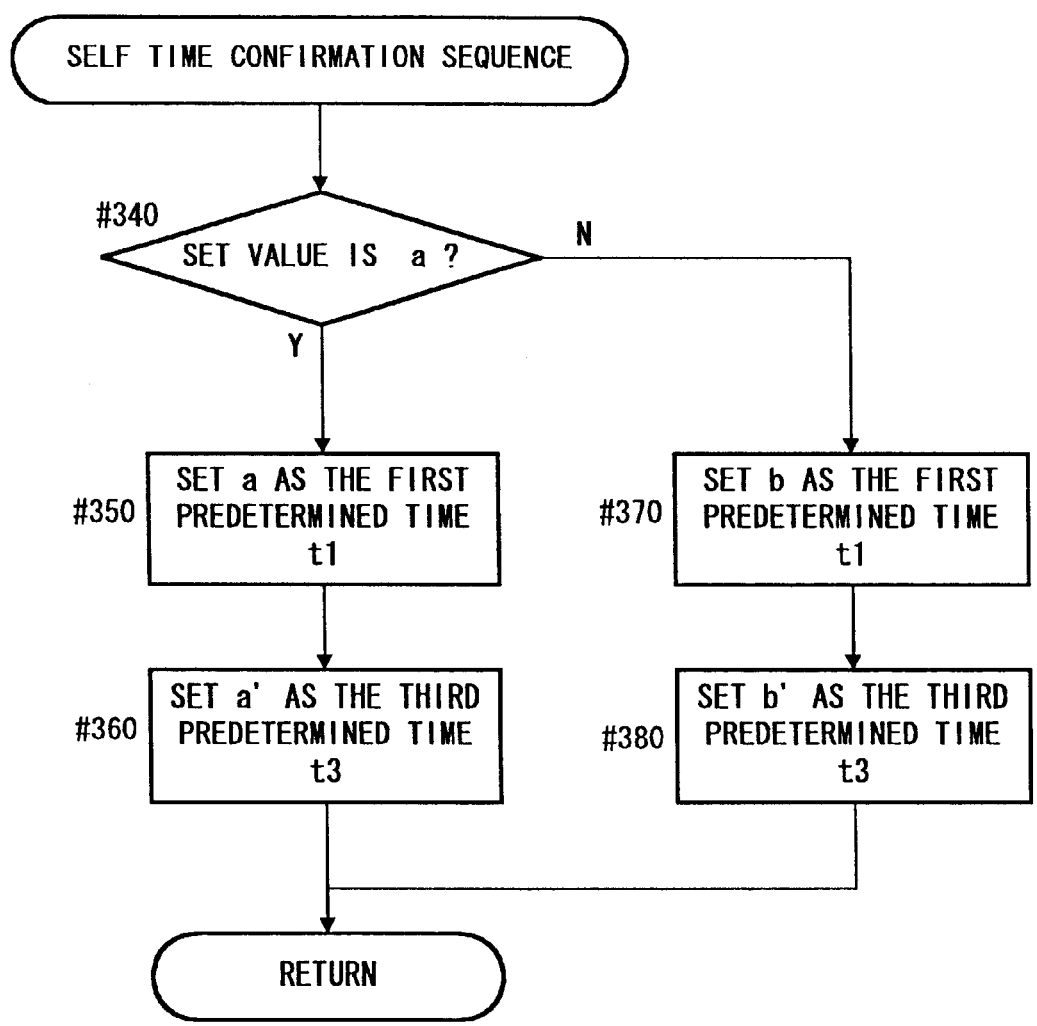
FIG. 6 is a flowchart showing a self-timer shooting standby time confirmation sequence.

Next, the release sequence in a second embodiment of the digital camera according to the present invention will be described with reference to FIGS. 5 and 6. FIG. 5 is a flowchart showing the release sequence in the second embodiment. In this embodiment, the self time (first predetermined time t1) in the "self-timer shooting mode" can be changed between two values, and in accordance with the change, the time (third predetermined time t3) for which the shot image is displayed after shooting is changed. Further, in this embodiment, means is provided for discontinuing the display of the shot image before the third predetermined time t3 has elapsed. Except these, the second embodiment is similar to the first embodiment. In the release sequence shown below, only the parts different from those of the first embodiment will be described.

The first difference is that after it is determined at step #220 that the camera is in the "self-timer shooting mode", a self time confirmation sequence is performed at step #230. FIG. 6 is a flowchart of the self time confirmation sequence. In this embodiment, two different values a and b (for example, a is 10 seconds and b is 15 seconds, and a<b) are provided as candidates of the set value of the self time (first predetermined time t1) that can be set by the photographer. In the self time confirmation sequence, whether the set value of the first predetermined time t1 is a or not is determined at step #340. When the set value is a, the process moves to step #350 to set a as the first predetermined time t1. Then, a' is set as the third predetermined time t3 at step #360, and the sequence returns. When it is determined at step #340 that the set value of the first predetermined time t1 is not a, the process moves to step #370 to set b as the first predetermined time t1. Then, at step #380, b' is set as the third predetermined time t3, and the sequence returns.

Here, the values of a' and b' are, for example, 15 seconds and 20 seconds which are five seconds longer than the values of a and b (a'<b'). That is, when a is set as the self time (first predetermined time t1), it is considered that the distance between the camera and the photographer who is the subject is comparatively short. Therefore, in this case, the comparatively short time a' is set as the shot image display time (third predetermined time t3). When b is set as the first predetermined time t1, since the probability that the photographer is at a distance from the camera is high, it is necessary that the long time b' is set as the third predetermined time t3. Because of this structure, only by setting the self time (first predetermined time t1), the shot image display time (third predetermined time t3) suitable for the set self time is automatically set, which is very convenient.

While the self time (first predetermined time t1) can be changed between two values in this embodiment, it may be changeable among more than two values. In that case, combinations of the self time (first predetermined time t1) and the shot image display time (third predetermined time t3) may be stored in a ROM, or a function may be set to calculate t3 from t1.

Reverting to the release sequence of FIG. 5, the second difference will be described. After returning from the self time confirmation sequence, the process moves to step #240 so that shooting is on standby for the self time (predetermined time t1) set in the self time confirmation sequence. Then, shooting is performed at step #250. After shooting is finished, at step #260, the shot image is displayed on the image display LCD 13. In this embodiment, at step #270, whether the self-timer shooting setting switch 9 is depressed or not is determined. When it is determined that the self-timer shooting setting switch 9 is depressed, the process moves to step #290 to end the display of the shot image, and the sequence returns.

The above-described structure is provided as the means for discontinuing the display of the shot image even before the shot image display time (third predetermined time t3) has elapsed when the photographer intends to do so. Because of this structure, after the photographer who is the subject returns to the camera and checks the shot image, the photographer can move to the next shooting without waiting until the third predetermined time t3 has elapsed. Thus, the camera provides excellent usability. By using the self-timer shooting setting switch 9 also as the means for discontinuing the display of the shot image like in this embodiment, it is unnecessary to provide a new operation member, and the operation is easy because it can be performed with a single switch depression.

In the digital camera according to the present invention, the time (third predetermined time t3) for which the shot image is displayed after shooting in the "self-timer shooting mode" is longer than the shot image display time (second predetermined time t2) in the "normal shooting mode". Because of this, it does not occur that the display of the shot image ends before the photographer who is the subject returns to the camera. Therefore, the photographer can check the image having just been shot, without performing any complicated operations. Since the shot image display time (third predetermined time t3) is longer than the self time (first predetermined time t1) in the "self-timer shooting mode", it is unnecessary for the photographer to flurry when returning to the camera after shooting.

While the self-timer shooting in which shooting is performed after several seconds have elapsed has been described in the embodiments, the present invention is applicable to so-called interval shooting in which shooting is performed after several minutes or several hours have elapsed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A digital camera comprising:

an image sensor for shooting a subject;

a selector for selecting a predetermined shooting mode, wherein the shooting mode is a mode in which shooting is performed after a first predetermined time has elapsed from an instruction to start shooting;

a first display controller for displaying a shot image on a display for a second predetermined time when the shooting mode is not selected; and a second display controller for displaying a shot image on the display for a third predetermined time being longer than the second predetermined time when the shooting mode is selected.

2. A digital camera as claimed in claim 1, wherein the third predetermined time is variable.

3. A digital camera as claimed in claim 2, wherein the first predetermined time is variable, and the third predetermined time is changed in accordance with the first predetermined time.

4. A digital camera as claimed in claim 1, wherein the third predetermined time is longer than the first predetermined time.

5. A digital camera as claimed in claim 1, further comprising a display discontinuing member for ending the display of the shot image on the display even before the third predetermined time has elapsed.

6. A digital camera as claimed in claim 5, wherein the display discontinuing member is the selector.

7. A digital camera as claimed in claim 1, wherein the first and second display controllers display the shot image on the display after shooting is finished.

8. A digital camera as claimed in claim 1, wherein the predetermined shooting mode is a self-timer shooting mode.

9. An image display method in digital camera, comprising:

shooting a subject;

selecting a predetermined shooting mode, wherein the shooting mode is a mode in which shooting is performed after a first predetermined time has elapsed from an instruction to start shooting;

displaying a shot image on a display for a second predetermined time when the shooting mode is not selected; and displaying a shot image on the display for a third predetermined time being longer than the second predetermined time when the shooting mode is selected.

* * * * *